Sept. 4, 1962 J. L. MICHAELIS 3,052,840

METHOD OF TESTING SEMICONDUCTING RECTIFIERS

Filed Aug. 22, 1957 3 Sheets-Sheet 1

INVENTOR.
JOHN L. MICHAELIS
BY Oscar L. Spencer
ATTORNEY

INVENTOR.
JOHN L. MICHAELIS
BY Oscar L. Spencer
ATTORNEY

Sept. 4, 1962 J. L. MICHAELIS 3,052,840

METHOD OF TESTING SEMICONDUCTING RECTIFIERS

Filed Aug. 22, 1957 3 Sheets-Sheet 3

INVENTOR.
JOHN L. MICHAELIS

BY Oscar L. Spencer

ATTORNEY 3,052,840
METHOD OF TESTING SEMICONDUCTING RECTIFIERS

John L. Michaelis, Pittsburgh, Pa., assignor, by mesne assignments, to Pittsburgh Plate Glass Company Filed Aug. 22, 1957, Ser. No. 679,630
7 Claims. (Cl. 324—52)

This invention relates to methods and apparatus for providing direct current at amperages in excess of 10,000 amperes, usually above 20,000 amperes and frequently above 80,000 amperes, at voltages in the range of 100 to 500 volts or above from an alternating current power source. It is especially adapted for supply of direct current to a series of electrolytic cells such as a series of alkali metal chloride cells which are used for the production of chlorine and caustic soda or to a series of electrolytic cells used for the production of aluminum or magnesium metal by electrolysis of a fused bath of aluminum salts or magnesium salts.

The present invention permits use of semiconductor rectifier diodes which operate at power efficiencies in excess of 98 percent and which have relatively low internal resistance, generally below about 0.02 ohm. Such rectifier diodes have internal voltage drops below one volt frequently in the range of 0.42 to 0.54 volt. By use of such semiconductor rectifier diodes as herein contemplated, a substantial saving in power is effected. Rectifiers of the type herein contemplated are those which rely upon the semiconductor properties of certain metalloids such as metallic germanium or silicon.

The unusually low resistance and high efficiency of semiconductor rectifiers such as the germanium and silicon rectifier diodes makes their use attractive. However, individual diodes can supply only a small amount of current in the range of about 50–500 amperes. Hence, it has been found that it is necessary to use a large number of such diodes coupled in parallel to meet the high current demand, and in series for higher voltage ratings. The rectifier systems herein contemplated contain at least 100 of the rectifier diodes so connected and may contain over 5,000 of such diodes or like units.

Figure 1:
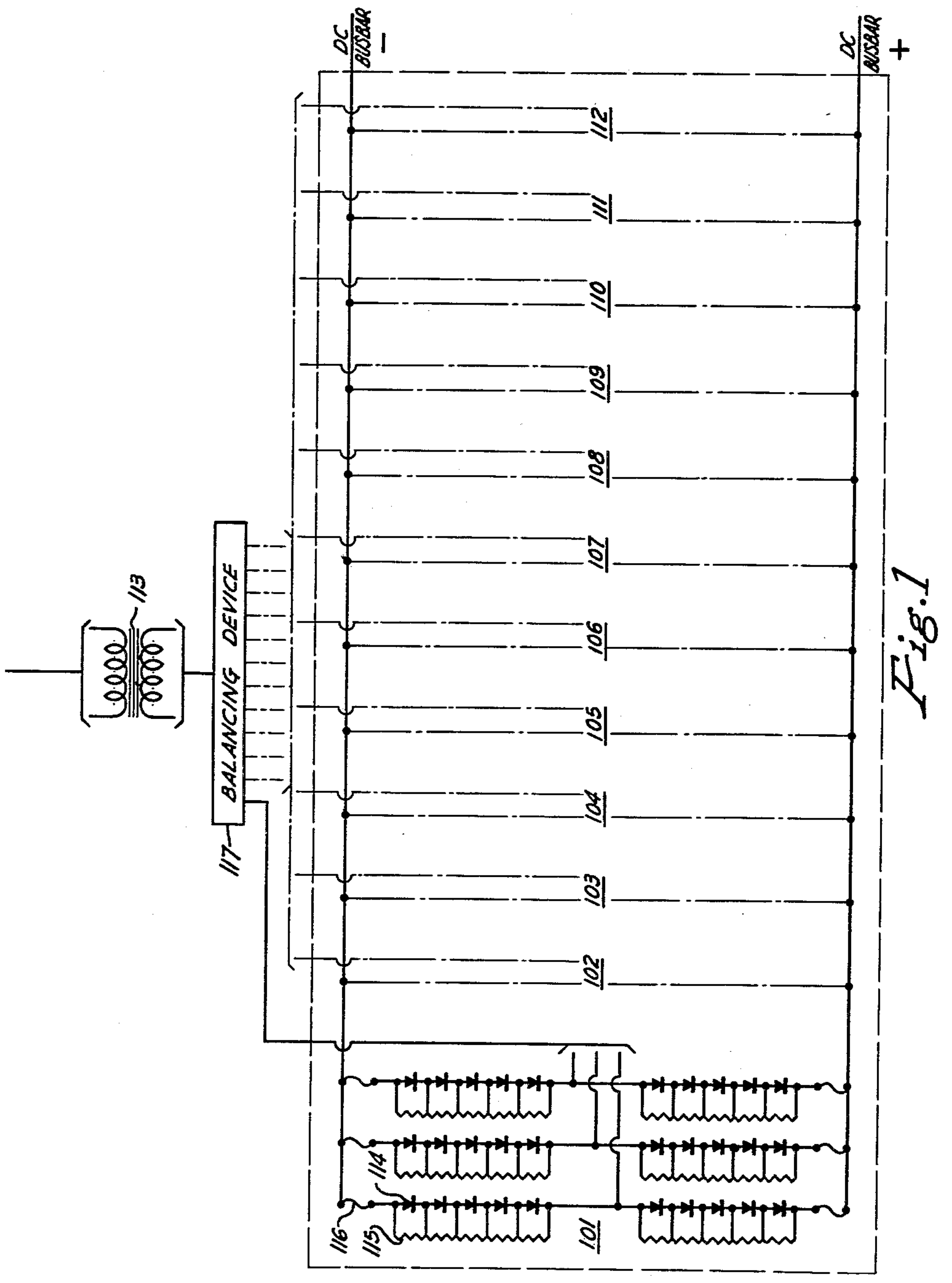
FIG. 1 is a diagrammatic illustration of a suitable circuit arranged to provide the desired rectification.

In FIG. 1 are shown twelve bridge circuits numbered 101 through 112 consecutively, connected to a power transformer 113. The semiconducting rectifier diodes 114 are arranged thirty in a bridge circuit in the illustration though this may be varied so long as each bridge circuit contains the same number of diodes in each leg of each bridge. Connected in shunt across each diode are 500 ohm resistors 115, said resistors being in series with each other. Though the resistors are shown only across the diodes of one leg of bridge 101, it is to be understood that this same system of resistors is placed across each diode and leg of all the bridge circuits shown.

At the direct current terminals of each bridge leg between the last diode in a series and the direct current leads or bus bars are located fuses 116. Connected in series with the power transformer is an electrical balancing system 117. The bridge circuits are connected in parallel and contain pluralities of semiconducting rectifiers connected in series.

A typical illustration is to supply direct current electric power at 118,800 amperes, 250 volts. With 150 ampere size rectifier junctions, each three-phase bridge will provide 450 amperes output. Thus 264 bridges are required in parallel each rated 450 amperes to provide 118,800 amperes total output.

To supply 118,800 amperes, 250 volts will require an alternating current power input of 29,700 kilowatts plus losses. These losses will be neglected to simplify discussion. The alternating current voltage input required is about 190 volts three-phase to provide the 250 volts direct current desired.

Each bridge requires 112.5 alternating current kilowatt input of 190 volts, three-phase or 342 alternating current amperes. The 264 bridges require an alternating current input of 90,288 amperes. In this system 22 cabinets are employed with each cabinet containing 12 bridges. Each bridge contains six legs with five diodes connected in series per leg for 250 volts direct current output voltage. Thus, 30 diodes are required for a six element bridge. From this it can be seen that each rectifier cabinet will contain 360 germanium rectifier diodes.

For convenience in mounting such large numbers of germanium rectifiers per cabinet sub-assemblies are provided which carry 15 germanium buttons or rectifiers per sub-assembly. Each sub-assembly is of rigid construction and is provided with 15 slots or nests in which the germanium rectifiers set. When in position on the sub-assemblies the germanium rectifiers are so placed that their cooling fins project from either side thereby permitting cooling air, free circulation from one surface of the sub-assembly to the other surface of the sub-assembly past the germanium cooling fins.

The cabinets in which the germanium sub-assemblies are mounted consist of a top and a bottom, two end sections and two lateral walls. The surfaces of the top section of the rectifier cubicle are closed as are the surfaces of the end portions. The surface or skin of the lateral walls of the rectifier cabinet contain a plurality of rectangular orifices therein. In this particular embodiment each lateral wall surface contains 180 orifices so that the total number of orifices on each cabinet is 360. The sub-assemblies are mounted in such a manner so that each row of five buttons on an assembly is parallel to the length of the cabinet wall and each row of three buttons on an assembly will be parallel to the height of the cabinet walls. In addition to this, sub-assemblies are so arranged that each individual button carried by a sub-assembly is in juxtaposition to an opening or orifice in the cabinet wall surface so that when the assembly is completed, the 360 buttons carried by each cabinet will be positioned directly opposite one of the apertures or orifices located on the surface of the cabinet wall.

The twenty-two rectifier cabinets employed in the system are mounted in the rectifier room over twenty-two openings in the floor thereof cut roughly in size corresponding to the dimensions of the bottom of the rectifier cabinet. Below the rectifier room is a basement room corresponding in size to the area of the rectifier room. Located within the basement are the power transformers and the electrical connections leading from the transformers to the elements contained in the rectifier cabinets. Located at one end of the basement near the fan mounting are finned cooling coils through which water is circulated at temperatures and rates sufficient to maintain the temperature of the air discharging from the coils at 20° C. Behind the cooling coils is a circulating fan of a size sufficient to circulate air from the basement of the building into the rectifying room at a rate of 320,000 cubic feet per minute. Sufficient cooling will be attained in a system of this size with air cooled at 20° C. if the air is circulated such that each diode will receive 40 cubic feet per minute air.

The cooling gas velocity is an important factor in the regulation of the internal temperature of the rectifiers contained in the system and depends in large measure on the characteristics of the rectifier cooling fins and the construction of the cooling orifices of the cubicles. Gas velocities of the order of from about 1000 to about 2000 feet per minute satisfactorily cool the rectifiers to desired temperatures in a system as described herein.

In the operation of the cooling system as hereinbefore described, power is supplied to the rectifying cabinets. The fan is energized and circulates air to the entire system at the rate of 320,000 cubic feet per minute. Water is circulated to the cooling coils located in the basement of the power room at between 15° C. and 17° C. A pressure differential exists between the rectifier room and the basement and is of the order of between about ¼ inch and 2 inches water pressure. The cooling air is circulated by the fan from the basement of the building into the rectifying room and due to the pressure differential existing between the air on the outside of the rectifying cabinets and that on the inside of the cabinets which are in communication with the basement of the building, the air is forced through the plurality of apertures or orifices on the rectifying cabinet walls into the basement. This air passing through the cabinet apertures does so at rates of 40 cubic feet per minute per aperture and consequently per diode. This equal flow of 40 cubic feet per minute per diode for the 7,920 diodes of this example is due to a constant air pressure differential and fixed orifice size for each diode in the system. In this manner the temperature differential between the diodes in the system is maintained at about 2° C.

As discussed previously, an important practical requirement of a large installation of semiconducting rectifiers is that all rectifiers carry their equal share of load. In normal operation a germanium diode has a forward voltage drop of approximately 0.5 volt and has a 60 volt reverse potential applied during the reverse or negative half cycle of the sine wave. The diode is therefore normally a high resistance element in the reverse direction. Temperature differentials between diodes cause variation in their internal resistance and consequent unequal load carrying capability among the different diodes. In addition a temperature rise above the maximum safety value, e.g., 65° C. for 150 ampere rated germanium diodes eventually destroy these diodes.

When a germanium diode fails the diode almost always has become a low resistance element in the reverse direction so that it no longer functions as a rectifier. By the cooling system of the present invention each individual germanium diode in each cabinet is cooled substantially to the same temperature, and no appreciable temperature differential exists between any two diodes in any one cabinet. In addition cooling is so conducted that no diodes in the system exceed the maximum safe temperature for the diode used. The exact temperature at which a diode will fail varies with the type and size of the diode used and the cooling system is easily adjusted by regulating the temperature of the coolant and the rate of flow so as to keep the diodes used within their designed safety limit.

While in this embodiment a set number of cabinets containing a set number of germanium rectifiers has been illustrated, it is, of course, obvious that the number of cabinets or the number of units contained in each cabinet may be changed without departing from the spirit or scope of the invention. The important thing is that the cooling be of a parallel nature, that is, that the cooling air pass each button in a parallel relationship so that each button will be cooled to substantially the same extent. Similarly, the shape of the cabinets may be changed or the diodes mounted on panels or walls instead of in cabinets so long as the provision of parallel cooling of the diodes be adhered to.

A feature of the present invention is the manner in which defective rectifiers are located in an installation employing several thousand of these semiconducting type rectifiers. Typically germanium rectifiers due to manufacturing imperfections, chemical impurities contained in the rectifiers, and other inherent characteristics of this nature, will exhibit a certain failure rate during the normal course of operation in the rectification system of the size hereinbefore described. This failure rate during the first two or three months operation often will amount between 3 percent and 5 percent of the germanium buttons contained in the rectification system due mainly to defects that were not revealed in the manufacturer's final electrical tests of the germanium diodes. After the first year of the operation, the failure rate among diodes of this type in a rectification system may approximate 1 percent. With failure rates of this nature, therefore, it is to be expected that in the first two or three months' operation with a rectification system employing say 3000 rectifiers, 90 to 150 buttons may be burned out. After the first year of operation this burn out rate may be reduced to about 30 buttons per year.

The random failure of semiconducting rectifiers in a rectification system can cause overload of good or operative semiconducting diodes in the same system and these diodes due to overload will also fail. It is therefore a practical necessity to periodically locate and replace all rectifiers that have failed during service. This may be accomplished either manually or automatically, depending on the choice of the operators.

Because of this failure rate and the fact that between say in a 3000 unit system replacement of between 90 and 150 buttons will be required within the first months' operation, the type of system employed for testing the whole rectification system for burn out of individual rectifiers is exceedingly important. In addition, due to the fact that a great number of buttons will be replaced during the first few months of operation, it is of equal importance from a cost and maintenance standpoint that the time for replacement of these burned out buttons be chosen by the user of such equipment.

It is, of course, possible to install an indicating lamp or voltmeter across each diode in a system employing several thousand diodes so that the condition of these electrical indicating devices will determine whether the diode with which they are associated is operative or not. For installation of this size, however, an approach of this type is impractical from an economic as well as a design standpoint.

Our system permits the use of a voltmeter or indicating lamp or an electrical circuit connected to an annunciator or other similar summarizing circuit which devices provide a voltage descriptive or indicative of the condition of a plurality of diodes. In this way, for example, in an installation of several thousand germanium diodes the condition of ten, twenty or even more diodes is indicated by means of a single electrical circuit. Thus, in an installation with 3000 germanium diodes 150 lamps or voltmeters could indicate the condition of the diodes in the entire system. As previously mentioned, the lamps if desired, may be replaced by summarizing circuits, through magnetic amplifiers, annunciators or other means. In this manner first the fact that a diode has failed in the system is known, then that a diode in a particular one of the 150 groups has failed is determined and finally by voltmeters the faulty diode in the group is easily determined.

While the bridge circuits of the present invention are so constructed that each leg of a bridge may safely operate with two buttons burned out therein, a burn out of more than two rectifiers in any leg may eventually cause burn out of that entire leg of the bridge. Since we are able to operate in the system, and the bridge circuits therein, with as many as two buttons out in any one leg of any one bridge, it is not imperative that we replace any one button burned out in a single bridge at the moment at which it is burned out. It is therefore desirable to merely test the bridges contained in any rectifier cabinet and to replace the germanium buttons burned out therein only at such time when there is a danger that increased burn out will cause the complete burn out of a leg of an entire bridge circuit.

Figure 3:
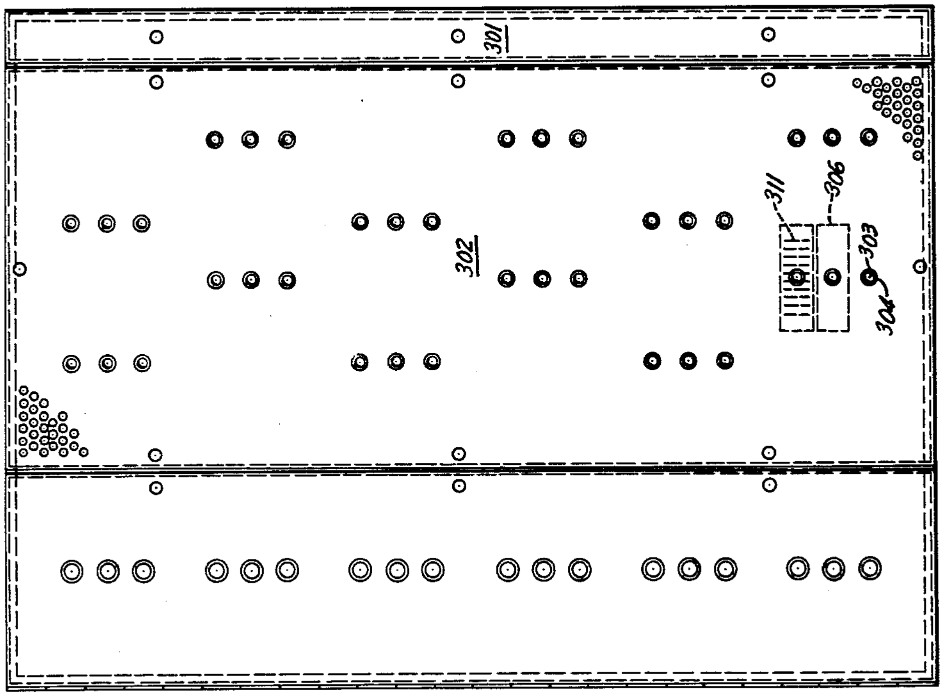
FIG. 3 is a side view of the cabinet screen with the insulated holes and fuse lights shown.

FIG. 3 shows a rectifier cabinet 301 with a screen in place on one of the walls. Orifices 306 are the cooling orifices for the rectifiers mounted within the cabinet and a rectifier with cooling fins 311 situated directly behind a cooling orifice 306. Holes or orifices 303 are positioned on the screened surface and each hole surrounded by an insulated bushing 304. The insulated holes 303 are arranged on the screened surface so that one hole is directly opposed to and in line with a cooling orifice 306 and associated with rectifier 311.

The rectifier diodes are preferably mounted on the cabinets in such a manner that the bridge legs of the rectifier circuits are positioned one below the other in groups of three, from the top of the cabinet wall to the bottom. The insulated testing holes are similarly placed one below the other in groups of three and one insulated hole is provided for each leg of each group of three bridge legs. By proper positioning of the diodes on the cabinet walls, one diode from each leg of each bridge circuit contained in a cabinet is placed behind one of the insulated test holes. This construction permits the insertion of an electrical probe through the insulated hole and associated air orifice so as to contact the rectifier cooling fins.

By the method of the present invention a screened surface or perforated panel is mounted on the outside of the rectifier mounting. The screen is equipped with a plurality of small holes surrounded by insulated bushings and of cross-sectional area large enough in size to permit passage of an electrical probe through the hole. There are provided on each germanium mounting or cabinet, screens with enough insulated holes thereon to provide one hole for each leg of each bridge circuit contained in that mounting or cabinet.

Thus, in a cabinet containing 12 bridge circuits as discussed in the typical illustration, the screens covering each of the walls on which the rectifier diodes are mounted will be provided with a total of 72 insulated holes, 36 for each side of the cabinet.

In placing the holes on the screened surface care is taken to insure that when the screens are in place a single rectifier diode in each leg of each bridge circuit will be positioned directly behind one of the holes. The holes are so placed therefore that they are aligned with the cooling orifices associated with the rectifier diodes. In this way when the diodes are mounted behind the cooling orifice they still are accessible to contact with a probe inserted in the insulated hole.

Since the connection of the bridge circuits is parallel and the alternating current power preferably three phase, the circuits are tested by legs of the same phase. For example, if the first and second bridge circuits are to be tested the procedure would involve inserting a probe through the insulated hole of the first A phase leg of the number one bridge circuit until a diode in that leg is contacted. Another probe is then placed in the corresponding A phase leg of the second bridge circuit until contact with a diode takes place and the leads of the two probes are then connected across an appropriate measuring device such as a lamp, voltmeter and the like. This method provides an accurate indication of the condition of the diodes in each leg since all units tested are essentially the same. Any voltage fluctuation occurring during the testing of the bridge legs indicates a change in condition in one of the legs of the bridges tested.

As has been described, the diodes and the bridge circuits are connected so that load is equally divided and the autotransformer provides equal voltage drop across the diodes in each bridge leg. Thus in testing, an intermediate voltage of one bridge leg is matched or compared to an identical intermediate voltage of a second bridge leg, and the voltage measured is zero if all the diodes are functioning. A burn out in one leg will be readily discernible due to the fact that the remaining diodes in that leg will equally divide load and hence the voltage drop across each remaining diode increases. This increase will cause a reading on a voltmeter or other voltage indicator connected across the diodes of the affected series of diodes and an electrically identical set of diodes such as another bridge leg in the same phase.

As can be seen an important aspect of the testing method employed is that the test be conducted to show voltage fluctuations across the diodes contained in series in each bridge leg. The probes are therefore placed in the legs tested at some point between the end diodes in each series being tested.

Figure 2:
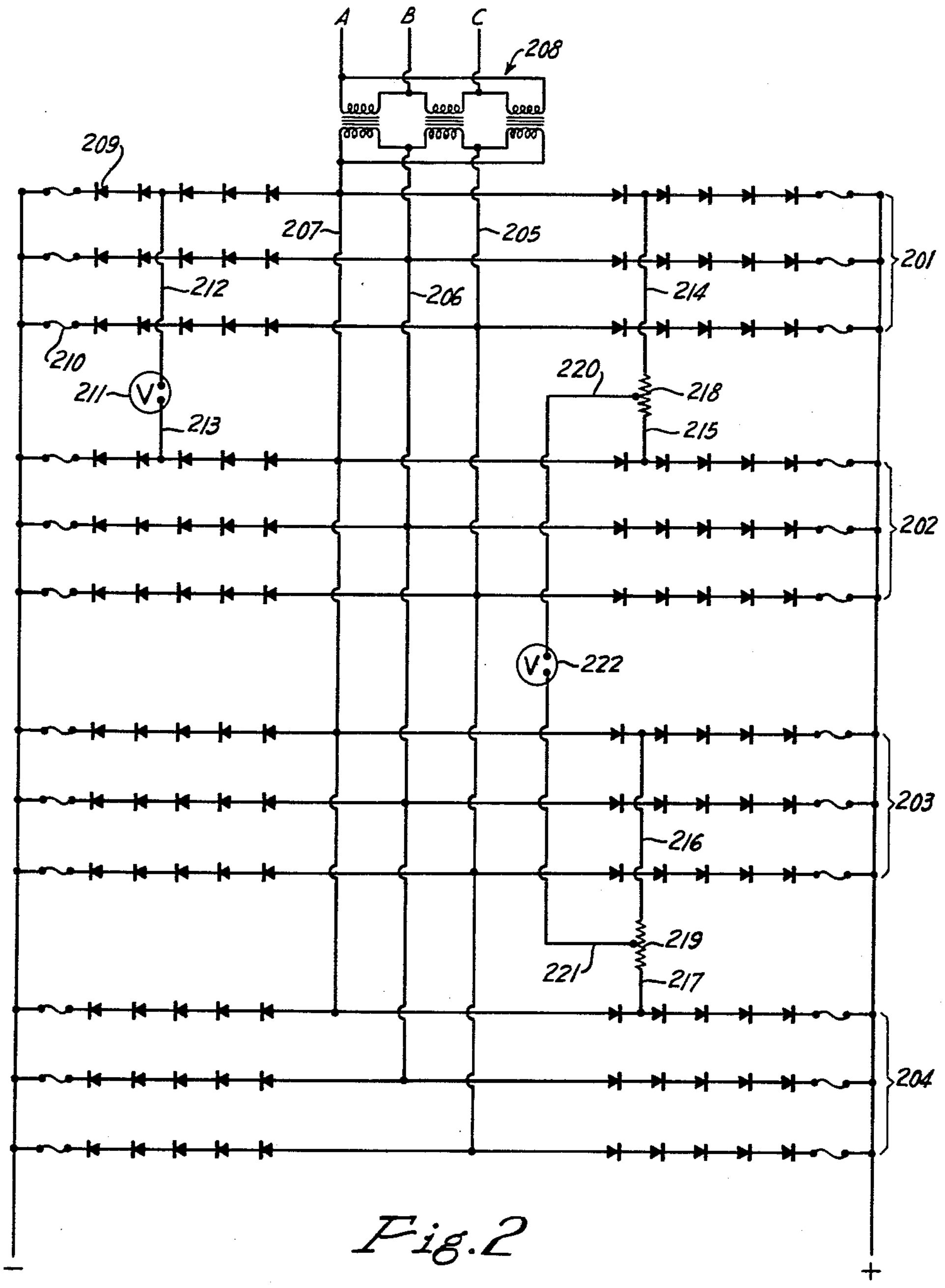
FIG. 2 is a diagrammatic illustration of the electrical testing system as applied to four bridge circuits.

For a more complete understanding, reference is made to FIG. 2 which shows four bridge circuits 201, 202, 203 and 204 connected through leads 205, 206 and 207 to a three phase power transformer secondary winding 208. Each bridge circuit contains six legs with five germanium diodes 209 illustrated in each leg of each bridge circuit. Fuses 210 are located on the direct current side of the line, one fuse being provided for each leg of each bridge.

A voltmeter 211 is shown connected by leads 212 and 213 to two corresponding legs of two bridge circuits so that the phase A bridge leg of bridge 201 is connected to the corresponding phase A bridge leg of bridge 202. A burn out of any diode in either of the connected bridges will result in a voltage indication in the voltmeter 211.

A second system is also shown in FIG. 2 whereby leads 214 and 215 are connected to corresponding legs of bridge circuits 201 and 202 with a resistor 218 connected between them. Similar connections are provided in leg leads 216 and 217 to two legs of bridge circuits 203 and 204 with a resistor 219 connected between the two leads. A connection is shown between the resistors 218 and 219 by leads 220 and 221. These leads 220 and 221 in turn have connected between them a voltmeter 222 for indicating any voltage indication that occurs in the four bridges connected thereto. Thus one measurement indicates a balanced potential simultaneously exists in 4 circuits, and that all diodes in these four circuits are of equal potential drop, and thus in good operating condition. A voltage indication signifies unequal potential division between the several diodes and thus that one or more diodes are defective.

As can be readily seen in this manner any number of bridge circuits can be tested together so long as the connection is made so that all legs tested are in the same phase and tested at a point within the end rectifiers of the rectifier series contained in the tested legs. Once the condition of a plurality of legs is known it is a simple matter to test them in pairs until the defective bridge leg between a pair is located. At this point, each button in each bridge leg is tested by placing a voltmeter across them one by one until the faulty unit is located.

If during the course of the test no fluctuation in voltage occurs on the voltmeter, the test is continued in bridge leg after bridge leg until the entire cabinet has been tested. In this way with the rectification system employed by this invention ten or more germanium buttons may be tested at one time by one measuring device.

If desired it is also possible to insert a relay system between any two legs of any two bridge circuits and attach them to an alarm or a light or some other indicating device to indicate to operators of the system that a burn out has occurred somewhere in the leg of the bridge circuit. In a further modification permanent leads may be inserted into the bushings between two individual legs of two different bridge circuits with the resistance connected intermediate. Two other leads may be inserted in two other legs of two other bridge circuits with a resistance located intermediate them and a voltmeter connected across two resistances. Any voltage fluctuation occurring in this case would indicate that a burn out has occurred somewhere within the four bridge legs connected by the leads and the resistance. In this manner as many as 20 bridges may be tested at one time.

Since the bridge legs employed in the rectification system are constructed so that they may operate with as many as two rectifiers in a bridge leg burned out, the defective diodes as they are discovered may be marked with paint or other similar marking material and left in the bridge leg rather than being replaced at the time of discovery.

As can be readily seen by the method of testing this rectification system and for marking burned out rectifiers, it is possible to store burned out rectifiers until such time as it is desirable for the user to accomplish a replacement. By this mode of operation, the operator of the system is allowed to store as many burned out rectifiers within the rectifier cabinets which still permit safe operation, and upon accumulation of a sufficient number of burned out units, shut down his system cabinet by cabinet to accomplish replacement in a single operation. This permits replacement of the burned out buttons at a time when it will be most convenient and economical for the operator to accomplish the replacement.

While the present invention has been described with reference to the specific details of certain embodiments, it is not intended that such details shall be regarded as limitations on the scope of the invention, except insofar as included in the accompanying claims.

This application is a continuation-in-part of my copending application, Serial No. 626,357, filed December 5, 1956, now Patent Number 2,881,383, Reissue Patent No. 25,000.

I claim:

1. A method of testing a direct current power source comprising a plurality of semiconducting rectifier bridge circuits coupled in parallel and connected to an alternating current source of power, each of said circuits having a plurality of rectifiers therein connected in series, and arranged to produce direct current of high amperage, which method comprises periodically measuring the voltage between a pair of bridge circuits at points in each bridge circuit between the end rectifiers in each of said series and when the voltage difference between said bridges increases, measuring the voltage drop across individual rectifiers in the measured bridge circuits.

2. The process of claim 1 wherein the number of rectifiers in series in each circuit is the same.

3. The process of claim 2 wherein the circuits measured are in the same phase.

4. A method of testing a direct current power source comprising a plurality of semiconducting rectifier bridge circuits coupled in parallel and connected to an alternating current source of power, each of said circuits having a plurality of rectifiers therein connected in series and arranged to produce direct current of high amperage, which method comprises measuring the voltage between a pair of said bridge circuits and when the voltage difference between said circuits increases, measuring the voltage drop across the individual rectifiers connected in series in said circuits.

5. The method of claim 4 wherein the circuits measured are in the same phase.

6. The method of claim 5 wherein the circuits measured contain the same number of rectifiers in series.

7. A method of providing and testing direct current power comprising establishing a plurality of semiconducting rectifier bridge circuits, said circuits being coupled in parallel and connected to an alternating current power source, each of said circuits having a plurality of semiconducting rectifiers therein connected in series, and arranged to produce direct current of high amperage, periodically measuring the voltage between a pair of bridge circuits at points in each bridge circuit between the end rectifiers in each of said series and when the voltage difference between said bridge circuits increases, measuring the voltage drop across individual rectifiers in the bridge circuits measured.

References Cited in the file of this patent

UNITED STATES PATENTS

| | | |
|---|---|---|
| 1,479,284 | Cullin | Jan. 1, 1924 |
| 1,696,025 | Atherton | Dec. 18, 1928 |
| 1,723,861 | Isshiki | Aug. 6, 1929 |
| 1,752,991 | Kopeliowitsch et al. | Apr. 1, 1930 |
| 2,123,859 | Winograd | July 12, 1938 |
| 2,158,934 | Griffith | May 16, 1939 |
| 2,444,458 | Master | July 6, 1948 |
| 2,447,658 | Marbury et al. | Aug. 24, 1948 |
| 2,547,011 | Jacobsen | Apr. 3, 1951 |
| 2,760,142 | Hitchcock | Aug. 21, 1956 |
| 2,820,189 | Uhlmann | Jan. 14, 1958 |